United States Patent
Ko (10) Patent No.: US 10,083,788 B2
(45) Date of Patent: Sep. 25, 2018

(54) INDUCTOR WITH COOLING APPARATUS FOR VEHICLE

(71) Applicant: HYUNDAI MOTOR COMPANY, Seoul (KR)

(72) Inventor: Kang Hoon Ko, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 45 days.

(21) Appl. No.: 14/846,203

(22) Filed: Sep. 4, 2015

(65) Prior Publication Data
US 2016/0125996 A1 May 5, 2016

(30) Foreign Application Priority Data

Nov. 5, 2014 (KR) .................. 10-2014-0152949

(51) Int. Cl.
*H01F 27/08* (2006.01)
*B60K 6/22* (2007.10)
*H01F 27/02* (2006.01)
*H01F 37/00* (2006.01)

(52) U.S. Cl.
CPC .............. *H01F 27/08* (2013.01); *B60K 6/22* (2013.01); *H01F 27/025* (2013.01); *H01F 37/00* (2013.01); *Y10S 903/904* (2013.01); *Y10S 903/952* (2013.01)

(58) Field of Classification Search
CPC .......... H01F 27/08; H01F 27/10; H01F 27/16; H01F 27/105; H01F 27/025; H01F 27/125; B60K 6/22
See application file for complete search history.

(56) References Cited

U.S. PATENT DOCUMENTS

| 5,293,070 A | * | 3/1994 | Burgess | ................ H01L 23/473 257/712 |
| 2001/0014029 A1 | * | 8/2001 | Suzuki | .................. H02M 7/003 363/141 |
| 2005/0180106 A1 | * | 8/2005 | Ohashi | ...................... F28F 1/22 361/699 |

(Continued)

FOREIGN PATENT DOCUMENTS

| JP | 2009-054303 A | | 3/2009 | |
| JP | 2011181856 A | * | 9/2011 | ............. H01F 27/08 |

(Continued)

OTHER PUBLICATIONS

JP2011181856A, Machine Translation, Sep. 2011.*

(Continued)

*Primary Examiner* — Elvin G Enad
*Assistant Examiner* — Malcolm Barnes
(74) *Attorney, Agent, or Firm* — McDermott Will & Emery LLP (57) ABSTRACT

An inductor apparatus for a vehicle includes an inductor boosting member configured to boost an input voltage. An inductor case has an insertion groove configured to receive the inductor boosting member inserted thereinto. An inductor cover is configured to close the inductor case. A coolant case is provided on a bottom surface of the inductor case. The coolant case has a coolant passage formed therein. A coolant cover is configured to close the coolant case.

16 Claims, 6 Drawing Sheets

(56) References Cited

U.S. PATENT DOCUMENTS

| | | | |
|---|---|---|---|
| 2006/0231236 A1* | 10/2006 | Spokoiny | H05K 7/20254 165/80.4 |
| 2007/0029665 A1* | 2/2007 | Lee | H01L 23/473 257/712 |
| 2008/0174255 A1 | 7/2008 | Schnetzka et al. | |
| 2008/0174257 A1 | 7/2008 | Schnetzka et al. | |
| 2008/0174258 A1 | 7/2008 | Schnetzka et al. | |
| 2008/0174393 A1 | 7/2008 | Schnetzka et al. | |
| 2012/0247743 A1* | 10/2012 | Niimi | H01L 23/473 165/181 |
| 2013/0114210 A1* | 5/2013 | Ebersberger | H01L 23/473 361/702 |
| 2015/0198372 A1* | 7/2015 | Desikan | F28D 1/0366 165/151 |
| 2015/0208556 A1* | 7/2015 | Kodama | B60L 3/003 363/123 |
| 2015/0365015 A1* | 12/2015 | Ito | H01F 27/06 336/208 |

FOREIGN PATENT DOCUMENTS

| | | | | |
|---|---|---|---|---|
| JP | 2013229406 A | * | 11/2013 | ............ H01F 37/00 |
| JP | 2014-90562 A | | 5/2014 | |
| JP | 2014-93882 A | | 5/2014 | |
| KR | 10-2009-0132031 A | | 12/2009 | |
| KR | 10-2010-0062971 A | | 6/2010 | |
| KR | 20100062971 A | * | 6/2010 | ............ F28D 15/02 |
| KR | 10-2011-0139038 A | | 12/2011 | |
| KR | 10-2013-0030899 A | | 3/2013 | |
| KR | 10-2014-0071115 A | | 6/2014 | |

OTHER PUBLICATIONS

JP2013229406A, Machine Translation, Nov. 2013.*
Notice of Allowance dated Jun. 2, 2016 issued in Korean Patent Application No. 10-2014-0152949.

* cited by examiner

INDUCTOR WITH COOLING APPARATUS FOR VEHICLE

CROSS-REFERENCE TO RELATED APPLICATION

This application is based on and claims the benefit of priority to Korean Patent Application No. 10-2014-0152949, filed on Nov. 5, 2014 in the Korean Intellectual Property Office, the disclosure of which is incorporated herein in its entirety by reference.

TECHNICAL FIELD

The present disclosure relates to an inductor apparatus for a vehicle, and more particularly, to an inductor apparatus for a vehicle having improved cooling efficiency by integrating an inductor case and a cooler case or improving a coolant channel.

BACKGROUND

A plug-in hybrid vehicle in which merits of a hybrid vehicle and an electric vehicle are combined has been recently developed. Such plug-in hybrid vehicle requires a voltage higher than a general hybrid vehicle in order to drive a motor.

That is, the plug-in hybrid vehicle includes a high voltage battery supplying a voltage for driving the motor, a low voltage battery supplying a low voltage of 12V used for electronic components, a hybrid power control unit (HPCU), a motor MG1 for driving the vehicle, a generator MG2 for a start on/off, and an engine.

Among the above-mentioned components, the HPCU includes a cover protecting internal parts, an inductor boosting an input voltage, an inverter power module inverting a direct current (DC) voltage into an alternating current (AC) three-phase voltage, a capacitor for smoothing an input current, a high voltage connector, which is an interface supplying an AC output voltage to the motor, and a housing providing an internal part assembly interface and protecting the parts.

Since the inductor of the HPCU according to the related art is a main heating element of the HPCU and performance thereof is affected by a cooling, the inductor is indirectly cooled while being assembled to a heat radiating plate after grease is applied on the heat radiating plate.

However, the inductor increases cooling by increasing adhesion with the heat radiating plate using the grease, but as the grease is dissipated after a predetermined time, adhesion between the inductor and the heat radiating plate is weakened. As a result, the cooling of the inductor by the heat radiating plate may be significantly decreased and performance degradation of the inductor may occur.

SUMMARY

The present disclosure has been made to solve the above-mentioned problems occurring in the prior art while advantages achieved by the prior art are maintained intact.

An aspect of the present disclosure provides an inductor apparatus for a vehicle capable of maintaining adhesion by, in certain embodiments, integrating an inductor case and a cooler case and preventing performance degradation of the inductor, accordingly.

An aspect of the present disclosure also provides an inductor apparatus for a vehicle capable of increasing cooling efficiency of an inductor and preventing performance degradation by, in certain embodiments, forming coolant channels in an inductor case and a cooler case so that coolant passes through the coolant channels in a zigzag shape and increasing a residence time of the coolant, accordingly.

According to an exemplary embodiment of the present inventive concept, an inductor apparatus for a vehicle includes an inductor boosting member configured to boost an input voltage. An inductor case has an insertion groove configured to receive the inductor boosting member inserted thereinto. An inductor cover is configured to close the inductor case. A coolant case is provided on a bottom surface of the inductor case. The coolant case has a coolant passage formed therein. A coolant cover is configured to close the coolant case. In certain embodiments, the inductor case and the coolant case may be integrally formed.

In certain embodiments, a first direction may be from the coolant case towards the inductor case, and the coolant passage may be formed perpendicularly to the first direction.

In certain embodiments, the bottom surface of the inductor case may be provided with a coolant accommodating groove connected to the coolant passage.

In certain embodiments, the inductor boosting member may include primary and secondary coil parts, and a bottom of the insertion groove may be provided with a central supporting part inserted between the primary and secondary coil parts and a side supporting part supporting an outer side surface of the primary or secondary coil part.

In certain embodiments, bottom sides of the central and side supporting parts may be provided with coolant introducing grooves connected to the coolant accommodating groove.

In certain embodiments, the coolant cover may be provided with a central guide part configured to be inserted into the coolant introducing groove of the central supporting part and a side guide part configured to be inserted into the coolant introducing groove of the side supporting part. In certain embodiments, the central or side guide part may be configured to decrease a width of the coolant introducing groove and increases cooling by rapid circulation of the coolant due to an increase in flow velocity of the coolant as the width of the coolant introducing groove is decreased.

In certain embodiments, the central and side guide parts may be integrally formed on the coolant cover.

According to another exemplary embodiment of the present inventive concept, an inductor apparatus for a vehicle includes an inductor boosting member configured to boost an input voltage. An inductor case has a top surface on which an insertion groove configured to receive the inductor boosting member inserted thereinto and a bottom surface having a coolant accommodating groove thereon. An inductor cover is configured to be placed over the insertion groove and to close the inductor case. A coolant case is formed on the bottom surface of the inductor case. The coolant case has first and second coolant spaces formed therein separated by a partition. The first and second coolant spaces are each connected to the coolant accommodating groove of the inductor case. The coolant case has coolant passages in which coolant is circulated through the first coolant space, the coolant accommodating groove, and the second coolant space.

In certain embodiments, the coolant passages may include a coolant supplying passage supplying the coolant to the first coolant space from outside of the inductor apparatus, a first coolant connection passage supplying the coolant to the coolant accommodating groove from the first coolant space, a second coolant connection passage supplying the coolant to the second coolant space from the coolant accommodating groove, and a coolant discharging passage discharging the coolant from the second coolant space to the outside of the inductor apparatus.

In certain embodiments, the coolant supplying passage may be a coolant supplying hole formed in one side of the coolant case and connected to the first coolant space.

In certain embodiments, the coolant case may have a top surface connected to the inductor case, and the first coolant connection passage may be a first coolant connection hole formed in one side of the top surface of the coolant case and connecting the first coolant space with the coolant accommodating groove.

In certain embodiments, the second coolant connection passage may be a second coolant connection hole formed in another side of the top surface of the coolant case and connecting the second coolant space with the coolant accommodating groove.

In certain embodiments, the coolant discharging passage may be a coolant discharging hole formed in a side of the coolant case and connecting the second coolant space to the outside of the inductor apparatus.

In certain embodiments, the first coolant space may have a coolant channel formed therein.

In certain embodiments, the inductor case and the coolant case may be integrally formed.

In certain embodiments, the inductor boosting member may include primary and secondary coil parts, and a bottom of the insertion groove may be provided with a central supporting part inserted between the primary and secondary coil parts and a side supporting part supporting an outer side surface of the primary or secondary coil part.
In certain embodiments, bottom sides of the central and side supporting parts may be provided with coolant introducing grooves connected to the coolant accommodating groove.

BRIEF DESCRIPTION OF THE DRAWINGS

The above and other objects, features and advantages of embodiments of the present inventive concept will be more apparent from the following detailed description taken in conjunction with the accompanying drawings.

DETAILED DESCRIPTION

Hereinafter, exemplary embodiments of the present inventive concept will be described in detail with reference to the accompanying drawings so that they can be easily practiced by those skilled in the art to which the present inventive concept pertains. However, the present inventive concept may be implemented in various different ways, and is not limited to the exemplary embodiments described in the specification. In the accompanying drawings, portions unrelated to the description will be omitted in order to clearly describe the present inventive concept, and similar reference numerals will be used to describe similar portions throughout the present specification.

An inductor apparatus for a vehicle according to the present disclosure may increase cooling efficiency by, in certain embodiments, integrating an inductor case in which an inductor boosting member is inserted (or, in certain embodiments, embedded) and a coolant case cooling the inductor boosting member or forming coolant channels in a zigzag shape.

Hereinafter, an inductor apparatus for a vehicle according to exemplary embodiments of the present inventive concept will be described in detail with reference to the accompanying drawings.

[Inductor Apparatus for Vehicle According to First Exemplary Embodiment]

Figure 1:
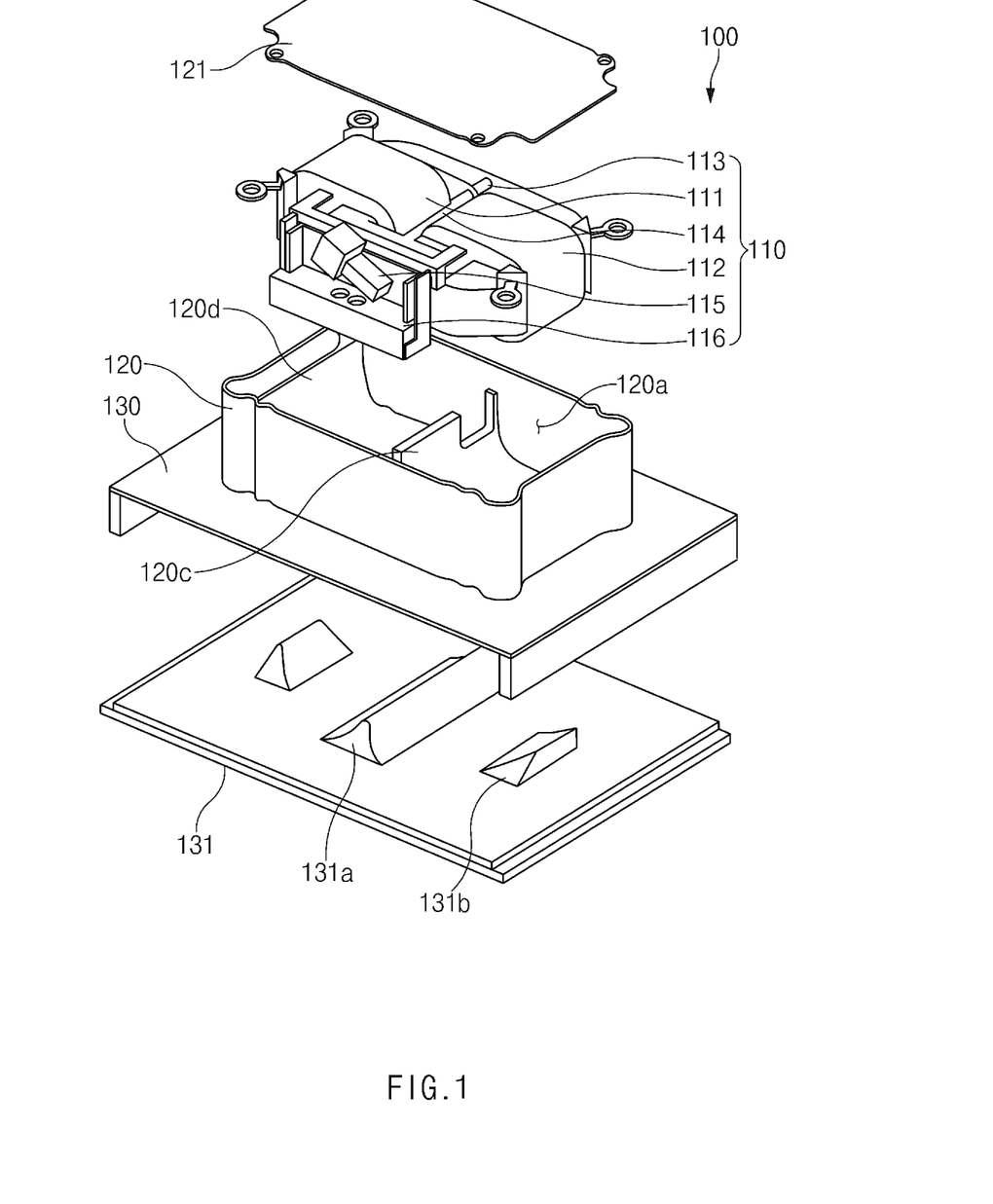
FIG. 1 is an exploded perspective view showing an inductor apparatus according to a first exemplary embodiment of the present inventive concept.
Figure 2:
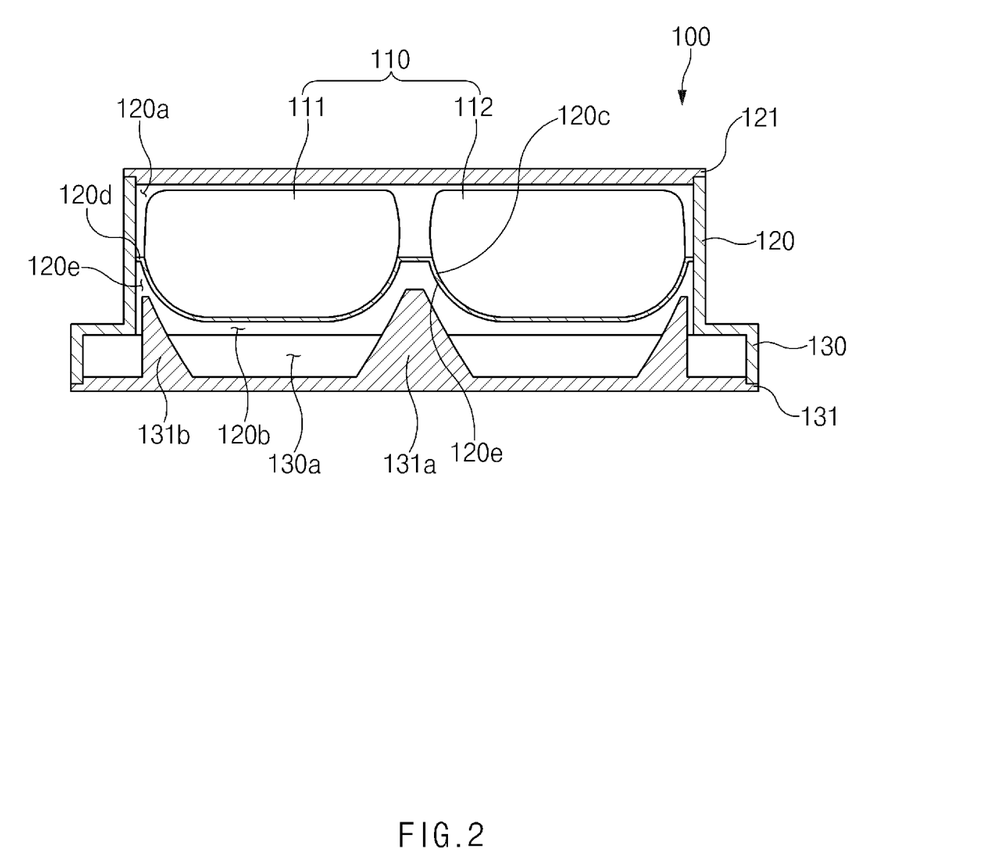
FIG. 2 is a cross-sectional view of FIG. 1.
Figure 3:
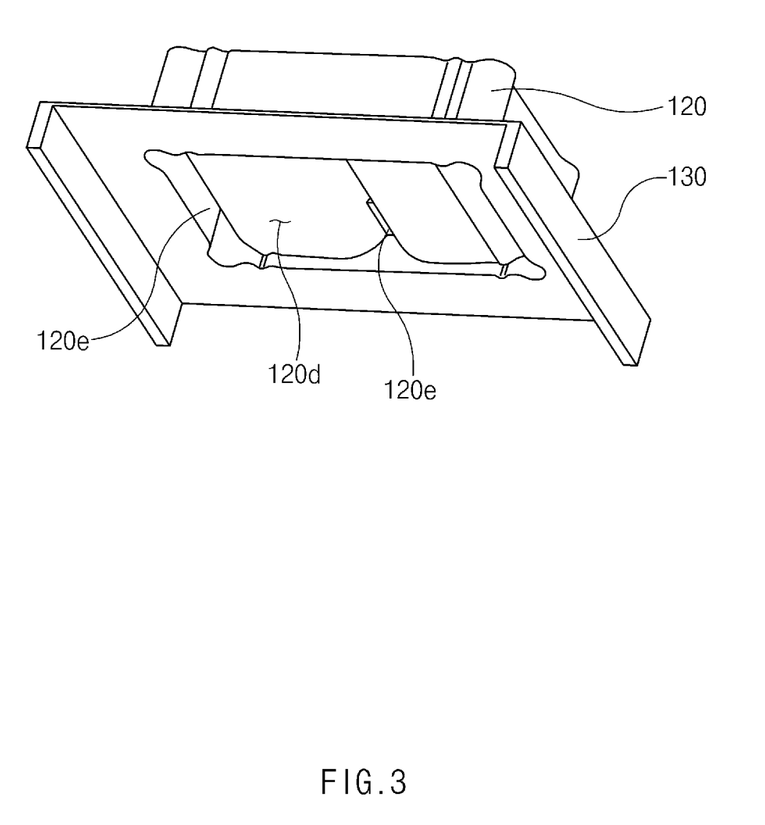
FIG. 3 is a bottom perspective view of an inductor case according to the first embodiment of the present inventive concept.

An inductor apparatus 100 for a vehicle according to a first exemplary embodiment of the present inventive concept includes an inductor boosting member 110 boosting an input voltage, and an inductor housing having an upper side in which the inductor boosting member 110 is inserted and a lower side in which coolant passages are formed, as shown in FIGS. 1 to 3.

The inductor boosting member 110 according to certain embodiments in the present disclosure, boosts a high voltage of 300V or more to 800V to 1200V or drops a high voltage of 300V to 12V so as to supply power, includes a primary coil part 111 receiving a low voltage, and a secondary coil part 112 converting and outputting the low voltage into the high voltage. In certain embodiments, the inductor boosting member includes one or more of the following: a temperature sensor 113 sensing temperature, an epoxy molding part 114 fixing and protecting the primary and secondary coil parts 111 and 112, a signal connector 115 outputting a temperature signal sensed by the temperature sensor 113, and a terminal 116 connecting the signal connector 115 and an external output terminal (not shown).

In certain embodiments, the primary and secondary coil parts 111 and 112 are each inserted (or, in certain embodiments, embedded) in left and right of a top surface of the inductor housing.

The inductor housing according to certain embodiments of the present invention includes the inductor case 120 in which the inductor boosting member 110 is inserted and the coolant case 130 through which coolant for cooling the inductor boosting member 110 passes, wherein the inductor case 120 is formed on an upper portion of the inductor housing and the coolant case 130 is formed on a lower portion of the inductor housing.

In certain embodiments, an insertion groove 120a into which the inductor boosting member 110 is inserted is formed on a top surface of the inductor case 120, and the insertion groove 120a is closed by the inductor cover 121. Thus, the inductor case 120 protects the inductor boosting member 110 from the outside while housing the inductor booting member 110 therein.

The coolant case 130 is provided on a bottom surface of the inductor case 120 and, in certain embodiments, has a lower portion closed by the coolant cover 131, thereby forming a coolant passage 130a penetrating through the coolant case 130 in a front and rear direction. In certain embodiments, in the coolant case 130, the coolant cools the inductor case 120 while passing through the coolant passage 130a from a front to a rear and the inductor boosting member 110 is indirectly cooled by the cooled inductor case 120. In certain embodiments, the front and rear direction is perpendicular to the direction from the coolant case 130 to the inductor case 120.

Here, the inductor housing according to an embodiment in the present disclosure has the inductor case 120 and the coolant case 130 which, in certain embodiments, are integrally formed, thereby making it possible to increase adhesion between the inductor case 120 and the coolant case 130 and more smoothly cool the inductor boosting member 110 inserted in the inductor case 120 by the coolant case 130. Particularly, as the inductor case 120 and the coolant case 130 are integrally formed, the manufacturing and assembling may be easy and consequently, costs may be reduced.

In certain embodiments, a coolant accommodating groove 120b connected to the coolant passage 130a is formed in the bottom of the inductor case 120 and some of the coolant passing through the coolant passage 130a is introduced into the coolant accommodating groove 120b, thereby making it possible to increase cooling of the inductor boosting member 110 inserted in the insertion groove 120a. That is, since an area exposed to the coolant is increased, cooling efficiency may be increased.

In certain embodiments, the insertion groove 120 is provided with a supporting part supporting lower portions of the primary and secondary coil parts 111 and 112 in a form surrounding the lower portions. The supporting part is formed at the center of a bottom surface of the insertion groove 120a and includes a central supporting part 120c supporting the primary and secondary coil parts 111 and 112 while being inserted therebetween and a side supporting part 120d formed at a left end or a right end of the bottom surface of the insertion groove 120a and supporting a side surface of the primary or secondary coil part 111 or 112.

In certain embodiments, the central supporting part 120c is formed in an equilateral triangular shape so as to support the primary and secondary coil parts 111 and 112 in a form surrounding the side surfaces to the lower portions of the primary and secondary coil parts 111 and 112, and the side supporting part 120d is formed in a right-angled triangular shape so as to support the side surface of the primary or secondary coil part 111 or 112 in a form surrounding the side surface to the lower portion of the primary or secondary coil part 111 or 112.

In certain embodiments, as the central supporting part 120c and the side supporting part 120d support the primary or secondary coil part 111 or 112 in the form surrounding the lower portion of the primary or secondary coil part 111 or 112, the central supporting part 120c and the side supporting part 120d may stably protect the primary or secondary coil part 111 or 112.

In certain embodiments, coolant introducing grooves 120e connected to the coolant accommodating groove 120b are formed in the bottom surfaces of the central and side supporting parts 120c and 120d, and some of the coolant introduced into the coolant accommodating groove 120b are introduced into the coolant introducing grooves 120e, thereby making it possible to increase the cooling of the inductor boosting member 110 inserted in the insertion groove 120a. That is, since an area exposed to the coolant is increased, cooling efficiency may be increased.

Meanwhile, in certain embodiments, the coolant cover 131 is provided with a central guide part 131a extended so as to be inserted into the coolant introducing groove 120e of the central supporting part 120c and a side guide part 131b extended so as to be inserted into the coolant introducing groove 120e of the side supporting part 120d.

In certain embodiments, as a width of the coolant introducing groove 120e is decreased, the central guide part 131a and the side guide part 131b increase flow velocity of the coolant introduced from the coolant accommodating groove 120b, thereby making it possible to increase cooling efficiency by a rapid circulation of the coolant due to the increase in flow velocity of the coolant.

In certain embodiments, the central guide part 131a and the side guide part 131b may be integrally formed on the coolant cover 131, whereby the manufacturing and assembling may be easy, a structure may be simplified, and costs may be reduced.

In certain embodiments, the central guide part 131a and the side guide part 131b may also be detachably formed on the coolant cover 131, whereby the central guide part 131a and the side guide part 131b having various shapes may be mounted on the coolant cover 131 so as to be replaceable and maintenance may be easy, and particularly, in the case in which the central guide part 131a and the side guide part 131b are manufactured of plastic mold, weight may be reduced and the shape may be changed.

Therefore, in certain embodiments, the inductor apparatus 100 for the vehicle according to the first exemplary embodiment of the present inventive concept having the configuration described above has the inductor case 120 and the coolant case 130 which are integrally formed, thereby making it possible to obtain stable adhesion and increase cooling efficiency.

[Inductor Apparatus for Vehicle According to Second Exemplary Embodiment]

Figure 4:
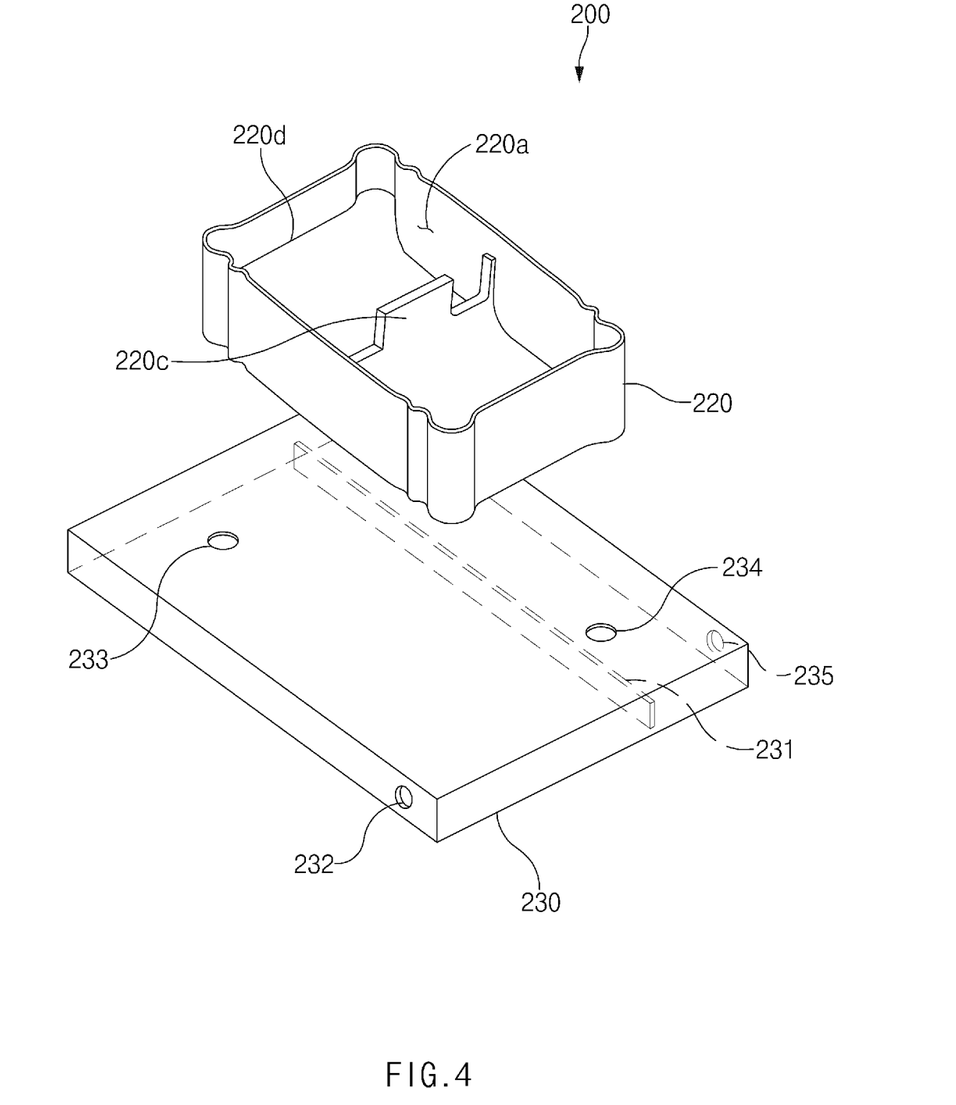
FIG. 4 is a bottom exploded perspective view of an inductor apparatus according to a second exemplary embodiment of the present inventive concept.
Figure 5:
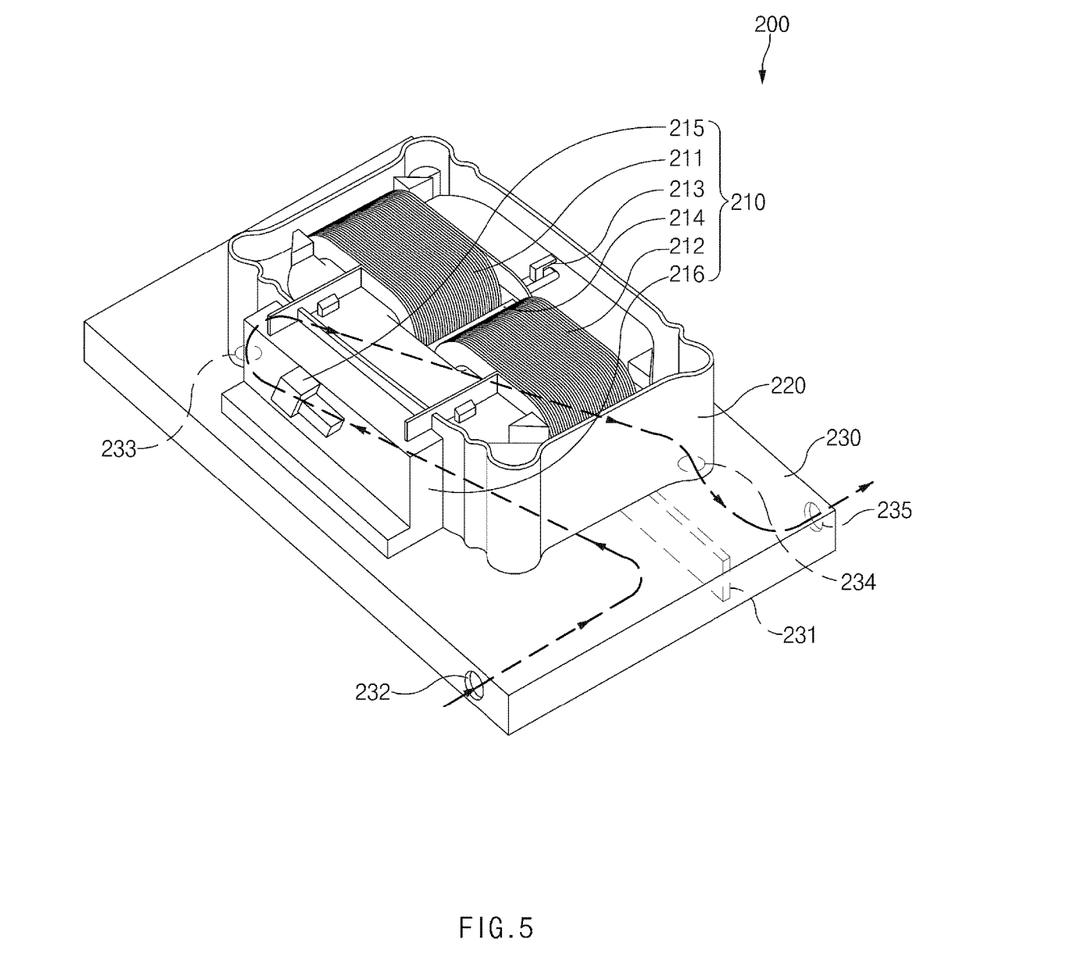
FIG. 5 is a front assembled perspective view of the inductor apparatus according to the second exemplary embodiment of the present inventive concept.
Figure 6:
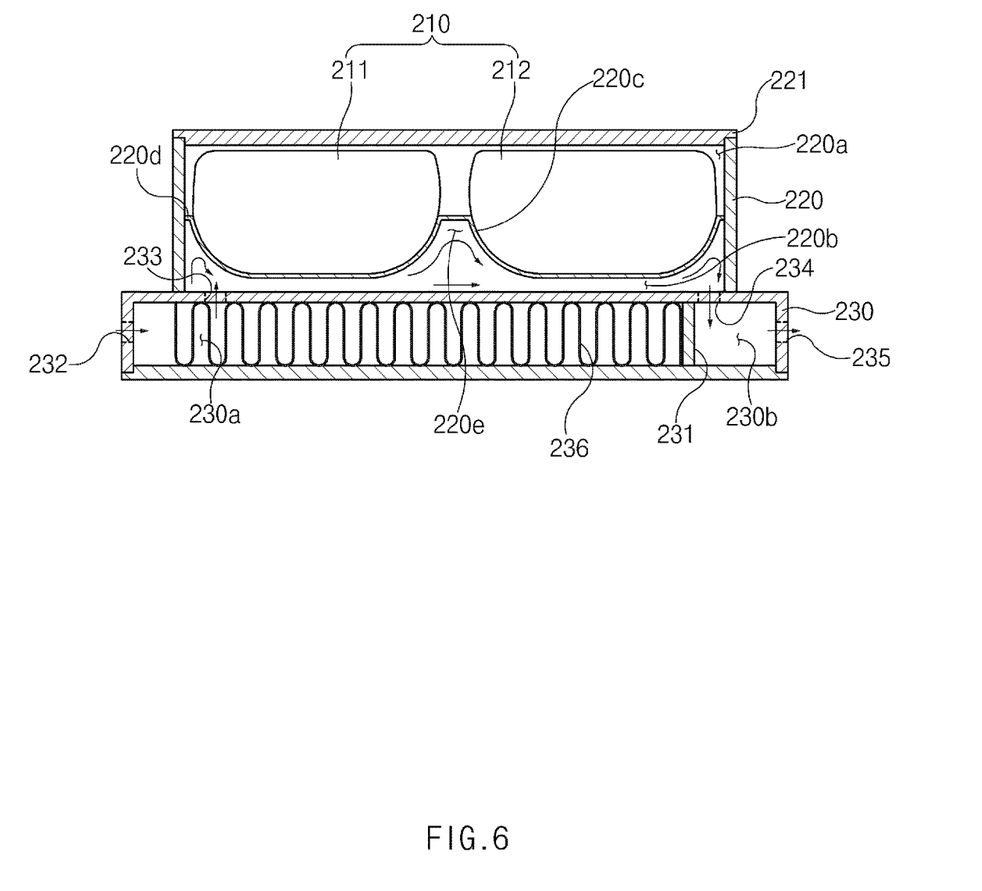
FIG. 6 is a cross-sectional view of FIG. 4.

An inductor apparatus 200 for a vehicle according to a second exemplary embodiment of the present inventive concept includes an inductor boosting member 210 boosting an input voltage, an inductor case 220 in which the inductor boosting member 210 is inserted, and a coolant case 230 cooling the inductor boosting member 210 inserted in the inductor case 220, as shown in FIGS. 4 to 6.

Referring to FIG. 5, in certain embodiments, the inductor boosting member 210 includes a primary coil part 211 receiving a low voltage, and a secondary coil part 212 converting and outputting the lower voltage into a high voltage. In certain embodiments, the inductor boosting member 210 may also include one or more of the following: a temperature sensor 213 sensing temperature, an epoxy molding part 214 fixing and protecting the primary and secondary coil parts 211 and 212, a signal connector 215 outputting a temperature signal sensed by the temperature sensor 213, and a terminal 216 connecting the signal connector 215 and an external output terminal (not shown).

An insertion groove 220a having the inductor boosting member 210 inserted thereinto and closed by an inductor cover 212 is formed on a top surface of the inductor case 220 and a coolant accommodating groove 220b accommodating the coolant is formed on a bottom surface of the inductor case 220.

In certain embodiments the insertion groove 220 is provided with a supporting part supporting lower portions of the primary and secondary coil parts 211 and 212 in a form surrounding the lower portions. The supporting part is formed at the center of a bottom surface of the insertion groove 220a and includes a central supporting part 220c supporting the primary and secondary coil parts 211 and 211 while being inserted therebetween and a side supporting part 220d formed at a left end or a right end of the bottom surface of the insertion groove 220a and supporting a side surface of the primary or secondary coil part 211 or 212.

In certain embodiments, the central supporting part 220c is formed in an equilateral triangular shape so as to support the primary and secondary coil parts 211 and 212 in a form surrounding the side surfaces to the lower portions of the primary and secondary coil parts 212 and 212, and the side supporting part 220d is formed in a right-angled triangular shape so as to support the primary or secondary coil part 211 or 212 in a form surrounding the side surface to the lower portion of the primary or secondary coil part 211 or 212. That is, the inductor boosting member 210 may be stably supported by the central supporting part 220c and the side supporting part 220d.

In certain embodiments, coolant introducing grooves 220e connected to the coolant accommodating groove 220b are formed in the bottom surfaces of the central and side supporting parts 220c and 220d, and some of the coolant introduced into the coolant accommodating groove 220b are introduced into the coolant introducing grooves 220e, thereby making it possible to increase the cooling of the inductor boosting member 210 inserted in the insertion groove 220a. That is, since the coolant introducing grooves 220e increase an area exposed to the coolant, it may cooling efficiency.

In certain embodiments, the coolant case 230 is provided with first and second coolant spaces 230a and 230b formed on the bottom surface of the inductor case 220, partitioned by a partition 231 therein, and each connected to the coolant accommodating groove 220b. That is, the coolant case 230 has coolant channels in which the coolant passes through the first coolant space 230a, the coolant accommodating groove 220b, and the second coolant space 230b.

In certain embodiments, the coolant channels have the coolant channels including a coolant supplying passage 232 supplying the coolant to the first coolant space 230a from the outside, a first coolant connection passage 233 supplying the coolant to the coolant accommodating groove 220b from the first coolant space 230a, a second coolant connection passage 234 supplying the coolant to the second coolant space 230b from the coolant accommodating groove 220b, and a coolant discharging passage 235 discharging the coolant from the second coolant space 230b to the outside.

In certain embodiments, the coolant supplying passage 232 is formed in an outer side of the coolant case 230 and is formed as a coolant supplying hole connected to the first coolant space 230a, thereby more rapidly supplying external coolant to the first coolant space 230a.

In certain embodiments, the first coolant connection passage 233 is formed in one side of a top surface of the coolant case 230 and is formed as a first coolant connection hole connecting the first coolant space 230a and the coolant accommodating groove 220b, thereby more rapidly supplying the coolant to the coolant accommodating groove 220b.

In certain embodiments, the second coolant connection passage 234 is formed in the other side of the top surface of the coolant case 230 and is formed as a second coolant connection hole connecting the second coolant space 230b and the coolant accommodating groove 220b, thereby more rapidly supplying the coolant to the second coolant space 230b.

In certain embodiments, the coolant discharging passage 235 is formed in a rear surface of the coolant case 220 and is formed as a coolant discharging hole connecting the second coolant space and the outside, thereby more rapidly discharging the coolant to the outside.

In certain embodiments, the first coolant connection passage 233 and the second coolant connection passage 234 are formed in both corners in a diagonal direction on the top surface of the coolant case 230, thereby increasing a residence time of the coolant and increasing cooling efficiency.

In certain embodiments, a plurality of coolant channels 236 are formed in the first coolant space 230a so that the coolant passes the coolant channels 236 in a zigzag shape, and the plurality of coolant channels 236 increase adhesion with the coolant, thereby increasing cooling efficiency.

In certain embodiments, the inductor case 220 and the coolant case 230 may be are integrally formed, thereby making it possible to increase easiness of the manufacturing and assembling and reduce the costs.

Since the inductor apparatus for the vehicle according to the second exemplary embodiment of the present inventive concept having the configuration described above has the coolant channels formed in the zigzag shape, the cooling efficiency of the inductor boosting member may be increased.

As described above, according to the exemplary embodiments of the present inventive concept, the following advantages may be obtained.

First, in certain embodiments, the inductor case and the coolant case are integrated, thereby making it possible to maintain adhesion between the inductor case and the coolant case and increase the cooling efficiency, and particularly, making it possible to reduce costs by high manufacturing and assembling efficiency.

Second, in certain embodiments, the coolant channels are formed in the inductor case and the coolant case so that the coolant passes through the coolant channels in the zigzag shape, thereby making it possible to increase cooling efficiency.

It should be interpreted that the scope of the present inventive concept is defined by the following claims rather than the above-mentioned detailed description and all modifications or alterations deduced from the meaning, the scope, and equivalences of the claims are included in the scope of the present inventive concept.

What is claimed is:

1. An inductor apparatus for a vehicle, the inductor apparatus comprising:
   an inductor boosting member configured to boost an input voltage;
   an inductor case having an insertion groove configured to receive the inductor boosting member inserted thereinto;
   an inductor cover configured to close the inductor case;
   a coolant case provided on a bottom surface of the inductor case, the coolant case having a coolant passage formed therein; and
   a coolant cover configured to close the coolant case, the coolant cover including at least one protrusion projecting upwardly from a lower surface thereof,
   wherein the inductor case and the coolant case are integrally formed such that the inductor case protrudes upwardly towards the inductor cover.

2. The inductor apparatus according to claim 1, wherein a first direction is from the coolant case towards the inductor case, and wherein the coolant passage is formed perpendicularly to the first direction.

3. The inductor apparatus according to claim 1, wherein the bottom surface of the inductor case is provided with a coolant accommodating groove connected to the coolant passage.

4. The inductor apparatus according to claim 3, wherein the inductor boosting member comprises primary and secondary coil parts, and a bottom of the insertion groove is provided with a central supporting part inserted between the primary and secondary coil parts and a side supporting part supporting an outer side surface of the primary or secondary coil part.

5. The inductor apparatus according to claim 4, wherein bottom sides of the central and side supporting parts are provided with coolant introducing grooves connected to the coolant accommodating groove.

6. The inductor apparatus according to claim 5, wherein the coolant cover is provided with a central guide part configured to be inserted into the coolant introducing groove of the central supporting part and a side guide part configured to be inserted into the coolant introducing groove of the side supporting part, and the central or side guide part is configured to decrease a width of the coolant introducing groove and increases cooling by rapid circulation of the coolant due to an increase in flow velocity of the coolant as the width of the coolant introducing groove is decreased.

7. The inductor apparatus according to claim 6, wherein the central and side guide parts are integrally formed on the coolant cover.

8. An inductor apparatus for a vehicle, the inductor apparatus comprising:
an inductor boosting member configured to boost an input voltage;
an inductor case having a top surface on which an insertion groove configured to receive the inductor boosting member inserted thereinto and a bottom surface having a coolant accommodating groove thereon;
an inductor cover configured to be placed over the insertion groove and to close the inductor case;
a coolant case formed on the bottom surface of the inductor case, the coolant case having first and second coolant spaces formed therein separated by a partition, the first and second coolant spaces each connected to the coolant accommodating groove of the inductor case, the coolant case having coolant passages in which coolant is circulated through the first coolant space, the coolant accommodating groove, and the second coolant space, wherein the inductor case and the coolant case are integrally formed such that the inductor case protrudes upwardly towards the inductor cover; and
a coolant cover configured to close the coolant case, the coolant cover including at least one protrusion projecting upwardly from a lower surface thereof.

9. The inductor apparatus according to claim 8, wherein the coolant passages include a coolant supplying passage supplying the coolant to the first coolant space from outside of the inductor apparatus, a first coolant connection passage supplying the coolant to the coolant accommodating groove from the first coolant space, a second coolant connection passage supplying the coolant to the second coolant space from the coolant accommodating groove, and a coolant discharging passage discharging the coolant from the second coolant space to the outside of the inductor apparatus.

10. The inductor apparatus according to claim 9, wherein the coolant supplying passage is a coolant supplying hole formed in one side of the coolant case and connected to the first coolant space.

11. The inductor apparatus according to claim 9, wherein the coolant case has a top surface connected to the inductor case, and the first coolant connection passage is a first coolant connection hole formed in one side of the top surface of the coolant case and connecting the first coolant space with the coolant accommodating groove.

12. The inductor apparatus according to claim 9, wherein the second coolant connection passage is a second coolant connection hole formed in another side of the top surface of the coolant case and connecting the second coolant space with the coolant accommodating groove.

13. The inductor apparatus according to claim 9, wherein the coolant discharging passage is a coolant discharging hole formed in a side of the coolant case and connecting the second coolant space to the outside of the inductor apparatus.

14. The inductor apparatus according to claim 9, wherein the first coolant space has a coolant channel formed therein.

15. The inductor apparatus according to claim 9, wherein the inductor boosting member comprises primary and secondary coil parts, and a bottom of the insertion groove is provided with a central supporting part inserted between the primary and secondary coil parts and a side supporting part supporting an outer side surface of the primary or secondary coil part.

16. The inductor apparatus according to claim 15, wherein bottom sides of the central and side supporting parts are provided with coolant introducing grooves connected to the coolant accommodating groove.

* * * * *